United States Patent
Obata et al.

(10) Patent No.: US 9,408,248 B2
(45) Date of Patent: Aug. 2, 2016

(54) COMMUNICATION CONTROL DEVICE AND COMMUNICATION CONTROL METHOD

(71) Applicant: NTT DOCOMO, INC., Tokyo (JP)

(72) Inventors: Hiroshi Obata, Tokyo (JP); Itsuma Tanaka, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 18 days.

(21) Appl. No.: 14/390,899

(22) PCT Filed: Apr. 4, 2013

(86) PCT No.: PCT/JP2013/060307
§ 371 (c)(1),
(2) Date: Oct. 6, 2014

(87) PCT Pub. No.: WO2013/151125
PCT Pub. Date: Oct. 10, 2013

(65) Prior Publication Data
US 2015/0078252 A1   Mar. 19, 2015

(30) Foreign Application Priority Data

Apr. 6, 2012   (JP) .................................. 2012-087759

(51) Int. Cl.
| | |
|---|---|
| *H04W 76/02* | (2009.01) |
| *H04L 29/06* | (2006.01) |
| *H04W 36/00* | (2009.01) |
| *H04W 68/00* | (2009.01) |
| *H04W 76/00* | (2009.01) |

(52) U.S. Cl.
CPC ......... *H04W 76/027* (2013.01); *H04L 65/1069* (2013.01); *H04L 65/1073* (2013.01); *H04W 36/0022* (2013.01); *H04L 65/1006* (2013.01); *H04L 65/1016* (2013.01); *H04L 65/1076* (2013.01); *H04W 68/00* (2013.01); *H04W 76/00* (2013.01)

(58) Field of Classification Search
None
See application file for complete search history.

(56) References Cited

U.S. PATENT DOCUMENTS

| 2004/0249887 A1* | 12/2004 | Garcia-Martin | H04M 7/123 706/204 |
|---|---|---|---|
| 2009/0154451 A1* | 6/2009 | Ku | H04L 29/1216 370/389 |

(Continued)

FOREIGN PATENT DOCUMENTS

WO   2009/003287 A1   1/2009

OTHER PUBLICATIONS

International Search Report for corresponding International Application No. PCT/JP2013/060307, mailed Jul. 9, 2013 (1 page).

(Continued)

*Primary Examiner* — Diane Lo
(74) *Attorney, Agent, or Firm* — Osha Liang LLP

(57) ABSTRACT

Provided are a communication control device by which a situation where a mobile station is disabled to receive a terminating call can be prevented from continuing for a long time, even when the IP-CAN bearer is removed for some reason. A P-CSCF 310 executes the steps of: detecting a state of the IP-CAN Bearer; transmitting a 503 Service Unavailable, rejecting a terminating call to an UE 100, to a source making the terminating call when loss of the IP-CAN Bearer which has been established is detected; and canceling the transmission of the rejection response when receiving a signal from the UE 100 in a situation where the loss of the IP-CAN bearer is detected, the signal being related to an originating call to the IP multimedia subsystem and being a signal other than registration to the IP multimedia subsystem.

5 Claims, 5 Drawing Sheets

(56) References Cited

U.S. PATENT DOCUMENTS

2010/0154029 A1* 6/2010 Fernandez Alonso .............. H04L 65/1016 726/1
2011/0310889 A1* 12/2011 Merino Vazquez ............. H04L 65/1069 370/352

OTHER PUBLICATIONS

Written Opinion for corresponding International Application No. PCT/JP2013/060307, mailed Jul. 9, 2013 (3 pages).
3GPP TS 23.228 V11.4.0; "3rd Generation Partnership Project; Technical Specification Group Services and System Aspects; IP Multimedia Subsystem (IMS); Stage 2 (Release 11);" Mar. 2012 (287 pages).
3GPP TS 24.229 V11.2.1; "3rd Generation Partnership Project; Technical Specification Group Core Network and Terminals; IP multimedia call control protocol based on Session Initiation Protocol (SIP) and Session Description Protocol (SDP); Stage 3 (Release 11);" Jan. 2012 (716 pages).
Extended European Search Report in counterpart European Application No. 13 77 2392.0 issued Nov. 12, 2015 (6 pages).
3GPP TR 23.818 V0.10.0; "3rd Generation Partnership Project; Technical Specification Group Services and Architecture; Optimisations and Enhancements for Realtime IMS communication (Release 7)", Feb. 2007 (70 pages).

* cited by examiner

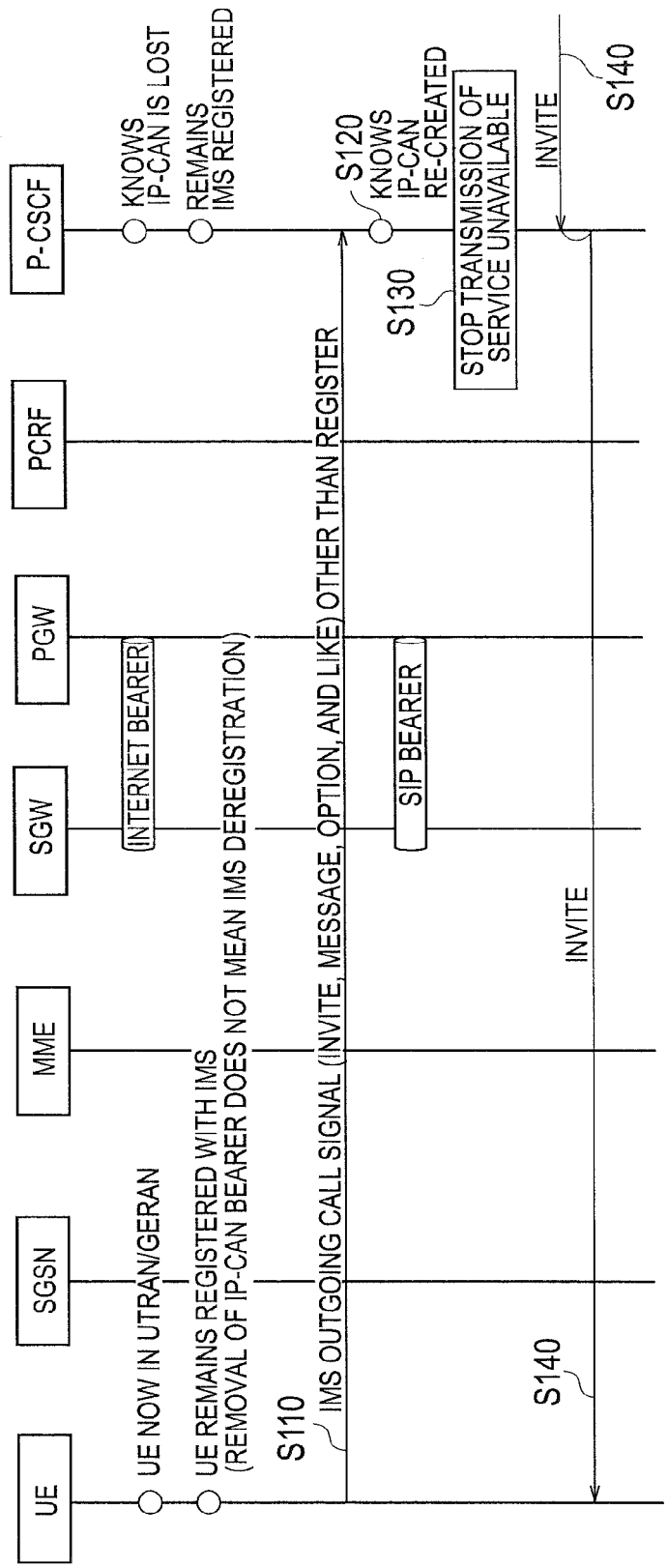

COMMUNICATION CONTROL DEVICE AND COMMUNICATION CONTROL METHOD

TECHNICAL FIELD

The present invention relates to a communication control device and a communication control method which are capable of connecting to an access network according to Internet protocol.

BACKGROUND ART

In Long Term Evolution (LTE), a scheme is specified in which a mobile station (UE) carries out LTE voice calls (VoLTE) by establishing an IP-CAN Bearer (SIP bearer), which is a logical communication path for Session Initiation Protocol (SIP) and voice media, on an IP-Connectivity Access Network (IP-CAN). IP-CAN is an access network providing a function to transport SIP and voice media (see, for example, Non-patent document 1).

FIG. 1 shows a communication sequence in a case where, after the mobile station establishes an IP-CAN Bearer, the IP-CAN Bearer is removed due to handover to UTRAN/GERAN. As shown in FIG. 1, when the mobile station executes handover to UTRAN/GERAN (S10), the IP-CAN Bearer is removed (removal) (S20).

PRIOR ART DOCUMENT

Non-Patent Document

Non-patent document 1: 3GPP TS 24.229 V11.2.1, 3rd Generation Partnership Project; Technical Specification Group Core Network and Terminals; IP multimedia call control protocol based on Session Initiation Protocol (SIP) and Session Description Protocol (SDP); Stage 3 (Release 11), January 2012

SUMMARY OF THE INVENTION

However, the conventional IP-CAN Bearer removal procedures described above have the following problem. Specifically, as shown in FIG. 1, after the mobile station executes Registration to an IP Multimedia core network Subsystem (IMS) including a Policy and Charging Rules Function (PCRF), a Primary-Call Session Control Function (P-CSCF) and the like, the IP-CAN Bearer is removed if the mobile station performs handover to UTRAN/GERAN or the like. In this case, the mobile station remains registered with the IMS (more specifically, the P-CSCF), but is kept having no IP-CAN Bearer. This leads to a problem that, when there is a terminating call to the mobile station from an IP-CAN Bearer on another network, the P-CSCF transmits an rejection response (503 Service Unavailable) to the other network because the IP-CAN Bearer for the mobile station is removed (S30 in FIG. 1).

Here, FIG. 2 shows an example of a situation where the mobile station remains registered with the IMS even after the IP-CAN Bearer is removed. Specifically, FIG. 2 shows a communication sequence in a case where the mobile station returns to LTE after executing handover to UTRAN/GERAN. As shown in FIG. 2, when the mobile station returns to LTE, a request to establish a session (Create Session Request) is transmitted to a Packet Data Network Gateway (PGW) ((1) in FIG. 2). However, the PGW cannot notify the P-CSCF that the IP-CAN Bearer is re-established and restored.

Meanwhile, even if the IP-CAN Bearer is re-established, a layer (Non-Access-Stratum layer) to execute the establishment of the IP-CAN Bearer and a layer (IMS application layer) to execute Registration to the IMS are different, and the mobile station does not execute Registration to the IMS upon re-establishment of the IP-CAN Bearer ((2) in FIG. 2). This leads to a problem that the P-CSCF continues to transmit the rejection response to another network even though the mobile station can communicate through the IMS ((3) in FIG. 2). More specifically, the problem is that a situation where the mobile station is disabled to receive a terminating call continues for a long time because the re-establishment of the IP-CAN Bearer by the mobile station does not trigger the Registration to the IMS.

The aforementioned problems can be summarized as follows. The technical standard of current 3GPP has problems that (1) when the IP-CAN Bearer (specifically, EPS Bearer/PDP Context for SIP transition) is disconnected for some reason, the mobile station cannot receive a terminating call until the mobile station executes Registration again and (2) the situation where the mobile station is disabled to receive a terminating call continues for a long time even if the P-CSCF receives an originating call signal (SIP INVITE, MESSAGE, OPTION, and the like) other than REGISTER from the mobile station.

Thus, the present invention has been made in view of such circumstances, and has an objective of providing a communication control device and a communication control method by which a situation where a mobile station is disabled to receive a terminating call can be prevented from continuing for a long time even when the IP-CAN Bearer, which is a logical communication path for SIP and voice media, is removed for some reason.

A first feature of the present invention is summarized as a communication control device which is capable of connecting to an access network according to Internet protocol and which controls a terminating call to a mobile station configured to execute registration to an IP multimedia subsystem according to the Internet protocol, the communication control device including: a bearer state detection unit configured to detect a state of a bearer which is a logical communication path between the mobile station and a gateway device included in the access network; and a terminating call control unit configured to transmit a rejection response to a source making the terminating call when the bearer state detection unit detects loss of the bearer which has been established, the rejection response rejecting a terminating call to the mobile station. Here, the terminating call control unit cancels the transmission of the rejection response when receiving a signal from the mobile station in a situation where the loss of the bearer is detected by the bearer state detection unit, the signal being related to an originating call to the IP multimedia subsystem and other than registration to the IP multimedia subsystem.

A second feature of the present invention is summarized as a communication control method which is capable of connecting to an access network according to Internet protocol and which is a method for controlling a terminating call to a mobile station configured to execute registration to an IP multimedia subsystem according to the Internet protocol, the communication control method including the steps of: detecting a state of a bearer which is a logical communication path between the mobile station and a gateway device included in the access network; transmitting a rejection response to a source making the terminating call when loss of the bearer which has been established is detected, the rejection response rejecting a terminating call to the mobile station; and canceling the transmission of the rejection response when receiving a signal from the mobile station in a situation where the loss of the bearer is detected, the signal being related to an originating call to the IP multimedia subsystem and other than registration to the IP multimedia subsystem.

BRIEF DESCRIPTION OF THE DRAWINGS

FIG. 5 is a view showing a communication sequence in a case where an IP-CAN Bearer is removed in the mobile communication system according to the embodiment of the present invention.

MODE FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

(1) Overall Schematic Configuration of Mobile Communication System

Figure 3:
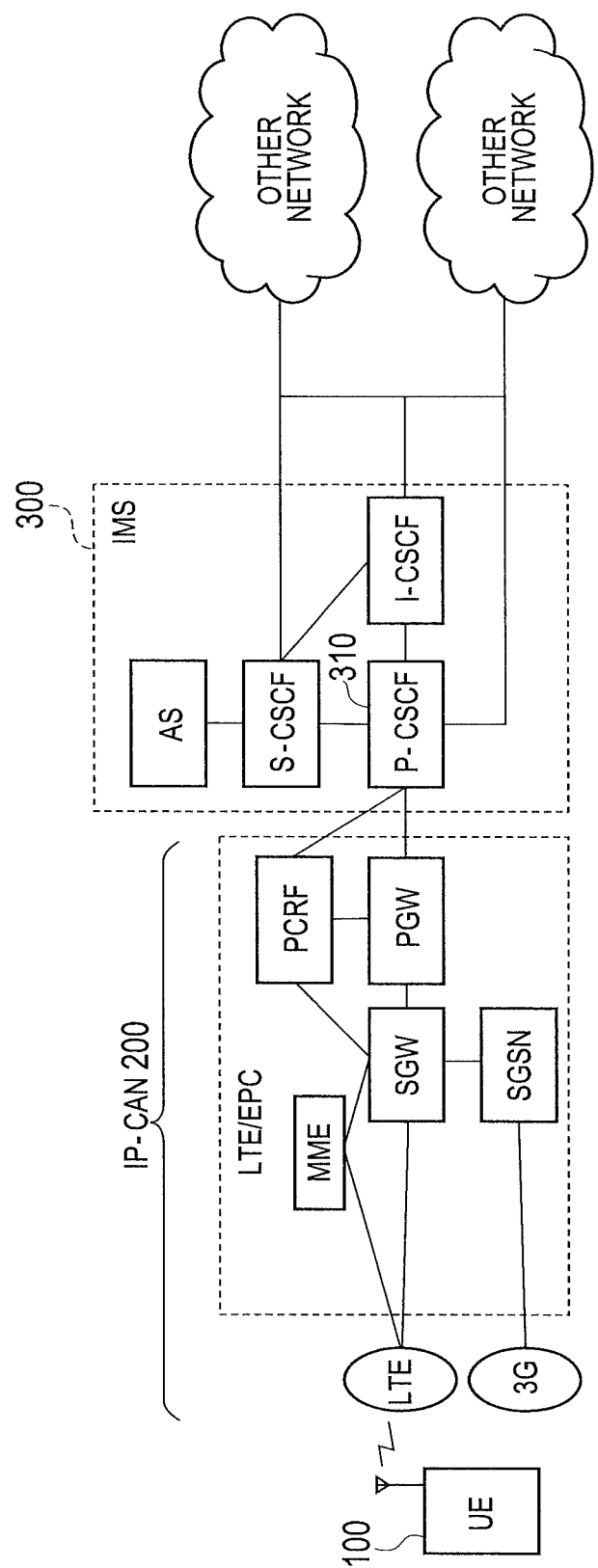
FIG. 3 is an overall schematic configuration diagram of a mobile communication system according to an embodiment of the present invention.

FIG. 3 is an overall schematic configuration diagram of a mobile communication system 10 according to the embodiment. As shown in FIG. 3, the mobile communication system 10 includes a mobile station 100 (hereafter, UE 100), an IP-Connectivity Access Network 200 (hereafter, IP-CAN 200), and an IP Multimedia core network Subsystem 300 (hereafter, IMS 300).

In the embodiment, the UE 100 can execute radio communication according to Long Term Evolution (LTE) and 3G (W-CDMA) schemes. The UE 100 can connect to the IP-CAN 200 according to the LTE or 3G scheme. Moreover, the UE 100 executes Registration of the UE 100 to the IMS 300 via the IP-CAN 200. For example, the UE 100 can execute registration of the UE 100 to the INS 300 according to the Registration procedure specified in section 5.1.1.1 and section L3.1.2 of 3GPP TS24.229.

The IP-CAN 200 is an access network according to the Internet Protocol (IP). Specifically, the IP-CAN 200 is a network configured to provide a function of transporting Session Initiation Protocol (SIP) and voice media, and corresponds to a LTE/Evolved Packet Core (EPC) network in the embodiment.

The IP-CAN 200 includes a Mobile Management Entity (MME), a Serving Gateway (SGW), a Packet Data Network Gateway (PGW), a Policy and Charging Rules Function (PCRF), and an SGSN (Serving GPRS Support Node).

The MME is an exchange which accommodates an eNodeB (radio base station) and which provides functions of mobility control, bearer control, and the like. The SGW is a servicing packet exchange accommodating a 3GPP (LTE) access system. The PGW is a connection point with an IMS base, and is a packet exchange configured to perform IP address assignment, packet transfer to the SGW, and the like. Moreover, the PGW works together with the PCRF to execute QoS control, bearer setting control, and the like. The PCRF is a logical node configured to execute control for QoS of user data transfer and control for charging. The SGSN is a packet exchange accommodating a UTRAN (3G) access system.

The IMS 300 is a multimedia subsystem according to the Internet protocol, and includes a Proxy-Call Session Control Function (P-CSCF 310), an Interrogating-Call Session Control Function (I-CSCF), a Serving-Call Session Control Function (S-CSCF), and an Application Server (AP).

The P-CSCF 310 is an SIP relay server placed at a connection point with the EPC, and has not only a SIP transfer function but also functions to start QoS control and to check the state of an IP-CAN Bearer in cooperation with the EPC (PCRF). Moreover, other networks (such as a fixed telephone network) are connected to the IMS 300. In the embodiment, the P-CSCF 310 forms a communication control device configured to control a terminating call to the mobile station.

(2) Functional Block Configuration of Communication Control Device

Figure 4:
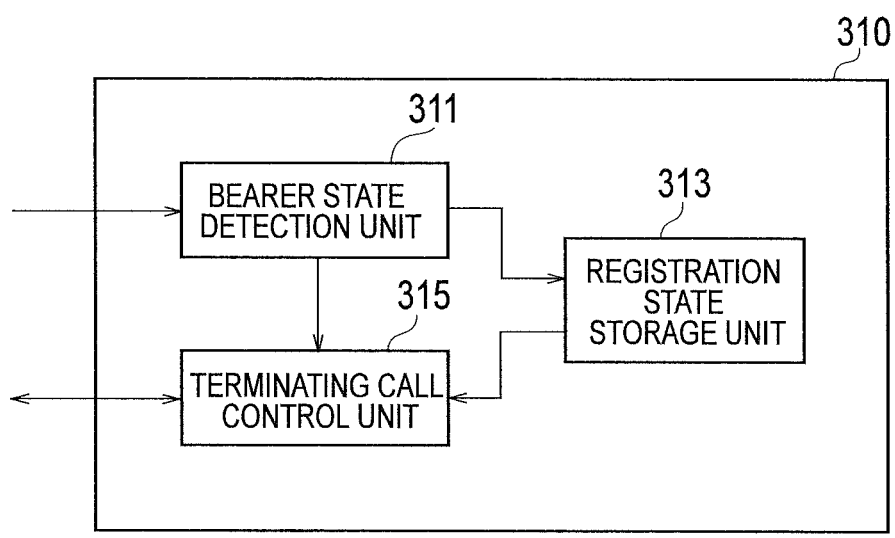
FIG. 4 is a functional block configuration diagram of a communication control device according to the embodiment of the present invention.

FIG. 4 is a functional block configuration diagram of the P-CSCF 310 forming the communication control device in the embodiment. As shown in FIG. 4, the P-CSCF 310 includes a bearer state detection unit 311, a registration state storage unit 313, and a terminating call control unit 315.

The bearer state detection unit 311 detects a state of the IP-CAN bearer which is a logical communication path between the UE 100 and the PGW (gateway device). Specifically, the bearer state detection unit 311 detects whether a S5 SIP Bearer and the S5 Internet Bearer are established between the UE 100 and the PGW. Note that the bearer state detection unit 311 can detect whether the bearers are established based on information notified from the PGW and the like.

Particularly, in the embodiment, the bearer state detection unit 311 detects the loss (lost) of the IP-Can Bearer (specifically, the S5 SIP Bearer) established between the UE 100 and the PGW. Note that causes of the loss of the IP-CAN Bearer include Inter-RAT handover of the UE 100 (for example, handover from 3G to LTE), failure of the IP-CAN 200, and the like.

The registration state storage unit 313 stores a registration state of the UE 100 with the INS 300. Specifically, the registration state storage unit 313 stores information indicating that the UE 100 is registered with the INS 300, based on detection of the establishment of the IP-CAN bearer by the bearer state detection unit 311. Moreover, when the registration of the UE 100 with the IMS 300 is deleted, the registration state storage unit 313 stores information indicating that the registration state of the UE 100 is deleted.

The terminating call control unit 315 controls a terminating call to the UE 100 from another network. Specifically, when the loss of the IP-CAN bearer established between the UE 100 and the PGW is detected by the bearer state detection unit 311, the terminating call control unit 315 transmits 503 Service Unavailable, which is a rejection response rejecting a terminating call to the UE 100, to a source making the terminating call (for example, another network to which a telephone terminal making a voice call to the UE 100 is connected).

In the embodiment, the terminating call control unit 315 cancels the transmission of the rejection response when receiving a signal from the UE 100 in a situation where the loss of the IP-CAN bearer is detected by the bearer state detection unit 311, the signal being related to an originating call to the IMS 300 and being a signal other than registration to the IMS 300. Specifically, the terminating call control unit 315 cancels the transmission of the rejection response when receiving at least one of signals of SIP INVITE, MESSAGE, and OPTION from the UE 100.

Upon receiving any of the aforementioned signals, the terminating call control unit 315 cancels the transmission of the rejection response and then accepts the terminating call to the UE 100 made from the other network.

Moreover, the terminating call control unit 315 can cancel the transmission of the rejection response when: the UE 100 is registered with the IMS 300 by the registration state storage unit 313; and the terminating call control unit 315 receives the signal from the UE 100 in the situation where the loss of the bearer is detected by the bearer state detection unit 311, the signal being related to the originating call to the IMS 300 and being the signal other than the registration to the IMS 300.

(3) Operations of Mobile Communication System

Next, description is given of operations of the mobile communication system 10 including the communication control device (P-CSCF 310) described above. FIG. 5 is a view showing a communication sequence in a case where the IP-CAN Bearer is removed in the mobile communication system 10.

Figure 1:
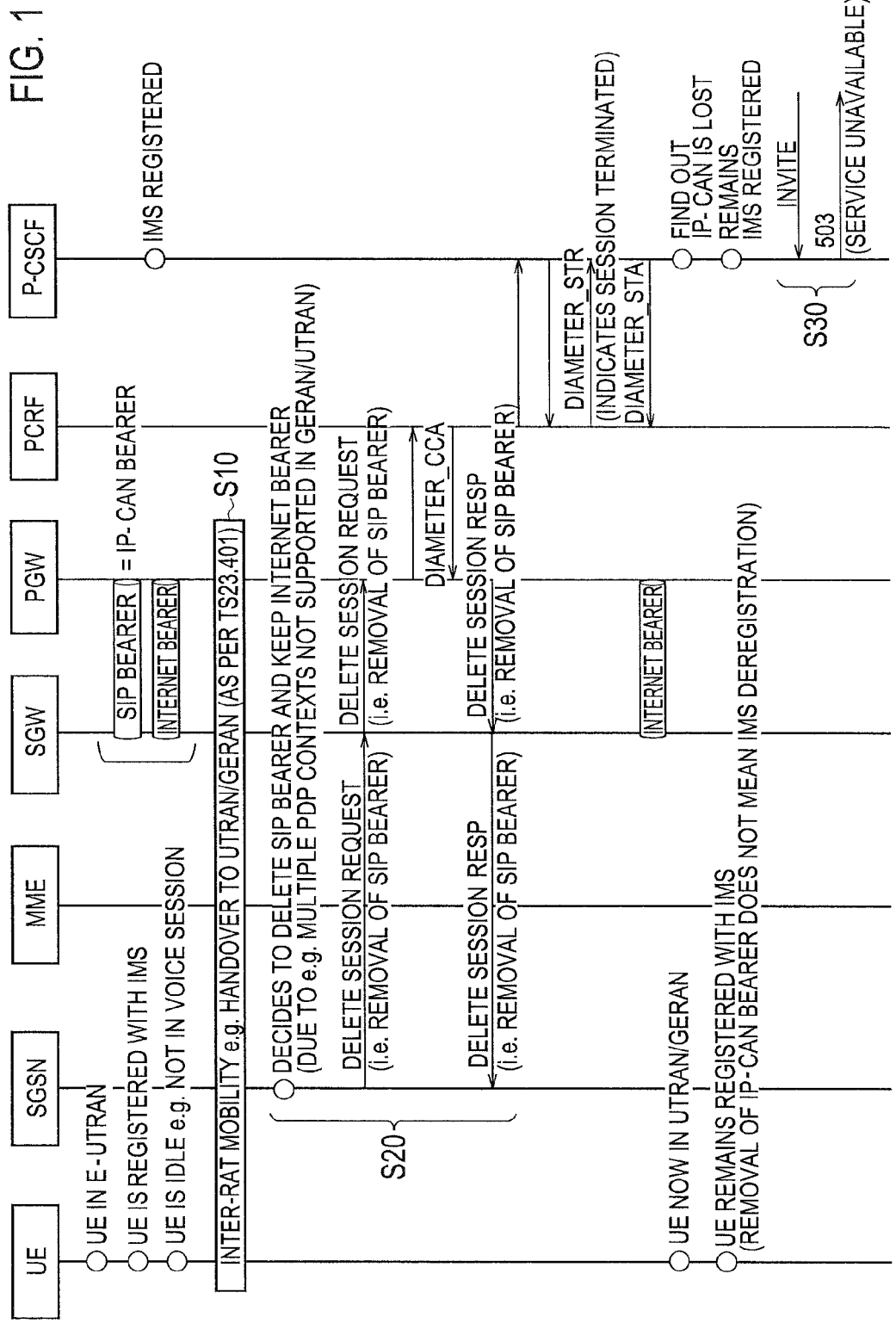
FIG. 1 is a view showing a communication sequence in a case where the IP-CAN Bearer is removed in a conventional mobile communication system.
Figure 2:
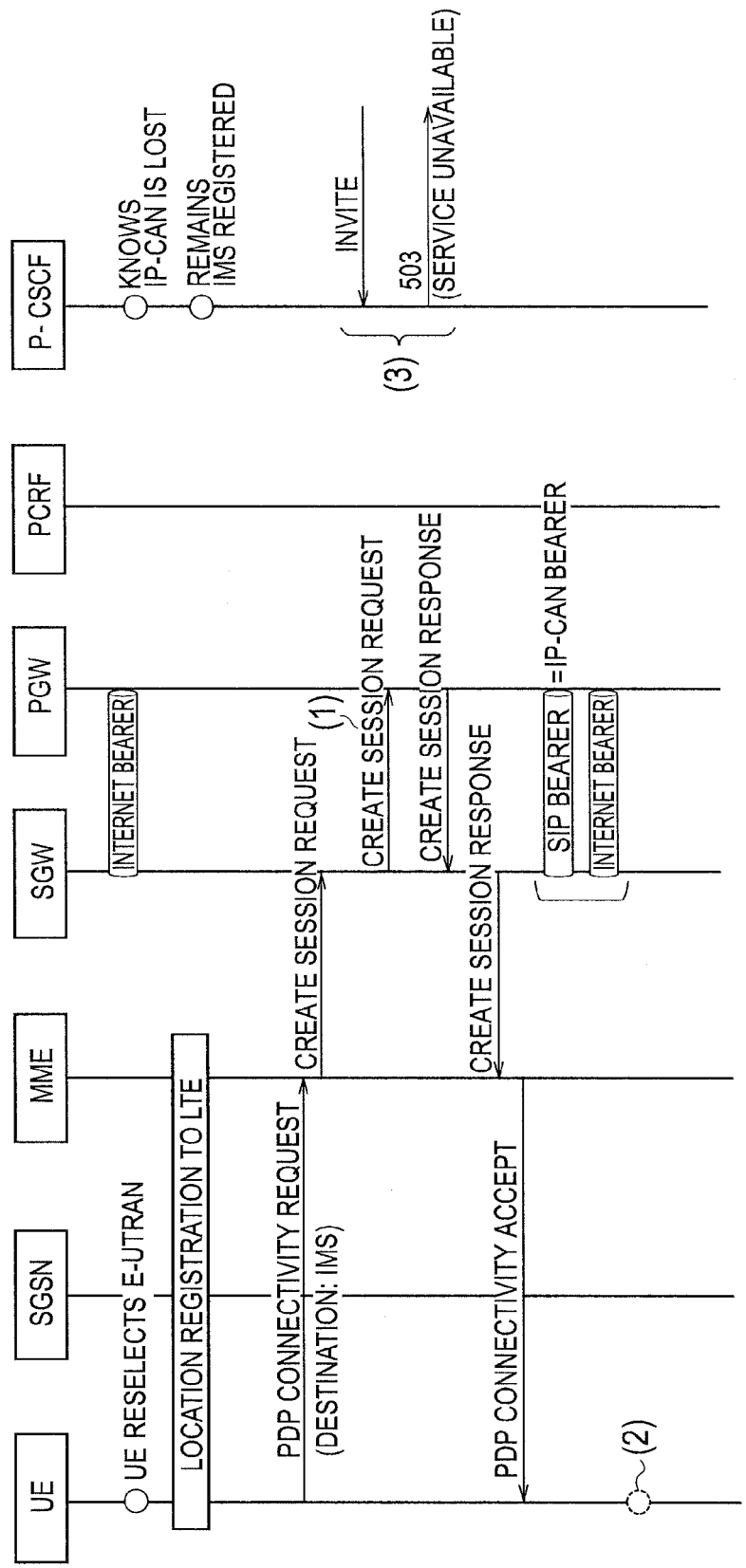
FIG. 2 is a view showing an example of a situation where a mobile station remains registered with an IMS even after the IP-CAN Bearer is removed in the conventional mobile communication system.

In FIG. 5, a situation where the UE 100 remains registered with the INS 300 after executing handover to the UTRAN (or GERAN) is similar to that in the conventional communication sequence shown in FIG. 1. Specifically, the communication sequence before step S110 shown in FIG. 5 is similar to the communication sequence before step S30 shown in FIG. 1, and the communication sequence in FIG. 5 is shown with part of the communication sequence being omitted.

As shown in FIG. 5, since the UE 100 remains registered with the IMS 300, the UE 100 transmits, to the P-CSCF 310, an IMS originating call signal other than Register requesting Registration to the IMS 300 (S110). Specifically, the UE 100 transmits a signal such as SIP INVITE, MESSAGE, or OPTION to the P-CSCF 310.

The P-CSCF 310 recognizes that the IP-CAN Bearer is re-established (re-establish) between the UE 100 and the PGW when receiving the IMS originating call signal like one described above (S120). In other words, the P-CSCF 310 recognizes that the UE 100 has re-established the IP-CAN Bearer with the PGW via the UTRAN (or GERAN).

Since the IP-CAN Bearer established by the UE 100 between the UE 100 and the PGW via LTE is lost due to the handover of the UE 100 to the UTRAN and the UE 100 remains registered with the IMS 300, the P-CSCF 310 transmits the 503 Service Unavailable rejecting the terminating call to the UE 100 from the other network as shown in step S30 of FIG. 1. However, after receiving the IMS originating call signal, the P-CSCF 310 recognizes that the IP-CAN Bearer is re-established between the UE 100 and the PGW and cancels the transmission of the 503 Service Unavailable (S130).

Thereafter, upon receiving the terminating call request (INVITE) to the UE 100 from the other network, the P-CSCF 310 transfers the terminating call request to the UE 100 (S140).

Such an operation of the P-CSCF 310 enables quick processing of the terminating call to the UE 100 even when the IP-CAN Bearer is re-established with the UE 100 being registered with the IMS 300.

(4) Advantageous Effects

According to the P-CSCF 310 described above, the transmission of the rejection response (503 Service Unavailable) to the source making the terminating call to the UE 100 is canceled when the P-CSCF 310 receives the IMS originating call signal from the UE 100 in the situation where the loss of the IP-CAN Bearer is detected.

Accordingly, it is possible to solve the problem that the rejection response is continuously transmitted in the situation where the IP-CAN Bearer is removed for some reason and the UE 100 remains registered with the IMS 300. In other words, a situation where the UE 100 is disabled to receive the terminating call can be prevented from continuing for a long time even when the IP-CAN Bearer is removed for some reason.

(5) Other Embodiment

As described above, the details of the present invention have been disclosed by using the embodiment of the present invention. However, it should not be understood that the description and drawings which constitute part of this disclosure limit the present invention. From this disclosure, various alternative embodiments will be easily found by those skilled in the art.

For example, the aforementioned embodiment is described by using UTRAN (3G) as an example. However, GERAN (2G) may be used instead of the UTRAN. Moreover, in the aforementioned embodiment, the P-CSCF 310 refers to the registration state of the UE 100 with the IMS 300 which is stored in the registration state storage unit 313, and determines whether to cancel the transmission of the rejection response. However, such an operation is not necessarily required. For example, the P-CSCF 310 may cancel the transmission of the rejection response upon receiving the aforementioned IMS originating call signal from the UE 100, regardless of the registration state of the UE 100 with the IMS 300.

The aforementioned embodiment is described by using SIP INVITE, MESSAGE, or OPTION as an example of the IMS originating call signal. However, any other signal (for example, SIP INFO) may be used.

The features of the present invention may also be expressed as follows. A first feature of the present invention is summarized as a communication control device which is capable of connecting to an IP-CAN 200 (an access network) according to Internet protocol and which controls a terminating call to UE 100 (a mobile station) configured to execute registration to IMS 300 (an IP multimedia subsystem) according to the Internet protocol, the communication control device including: a bearer state detection unit 311 (a bearer state detection unit) configured to detect a state of an IP-CAN Bearer (a bearer) which is a logical communication path between the mobile station and PGW (a gateway device) included in the access network; and a terminating call control unit 315 (a terminating call control unit) configured to transmit 503 Service Unavailable (a rejection response) to a source making the terminating call when the bearer state detection unit detects loss of the bearer which has been established, the rejection response rejecting a terminating call to the mobile station. Here, the terminating call control unit cancels the transmission of the rejection response when receiving a signal from the mobile station in a situation where the loss of the bearer is detected by the bearer state detection unit, the signal being related to an originating call to the IP multimedia subsystem and being a signal other than registration to the IP multimedia subsystem.

In the first feature of the present invention, the communication control device further includes a registration state storage unit 313 (a registration state storage unit) configured to store information indicating that the mobile station is registered with the IP multimedia subsystem, based on detection of establishment of the bearer by the bearer state detection unit. Here, the terminating call control unit may cancel the transmission of the rejection response when: the mobile station is registered with the IP multimedia subsystem by the registration state storage unit; and the terminating call control unit receives the signal from the mobile station in the situation where the loss of the bearer is detected by the bearer state detection unit, the signal being related to the originating call to the IP multimedia subsystem and other than registration to the IP multimedia subsystem.

In the first feature of the present invention, the terminating call control unit may cancel the transmission of the rejection response when receiving at least one of signals of SIP INVITE, MESSAGE, and OPTION from the mobile station.

In the first feature of the present invention, the terminating call control unit may cancel the transmission of the rejection response and accepts the terminating call to the mobile station.

A second feature of the present invention is summarized as a communication control method which is capable of connecting to an access network according to Internet protocol and which is a method for controlling a terminating call to a mobile station configured to execute registration to an IP multimedia subsystem according to the Internet protocol, the communication control method including the steps of: detecting a state of a bearer which is a logical communication path between the mobile station and a gateway device included in the access network; transmitting a rejection response to a source making the terminating call when loss of the bearer which has been established is detected, the rejection response rejecting a terminating call to the mobile station; and canceling the transmission of the rejection response when receiving a signal from the mobile station in a situation where the loss of the bearer is detected, the signal being related to an originating call to the IP multimedia subsystem and other than registration to the IP multimedia subsystem.

Note that the entire content of Japanese Patent Application No. 2012-087759 (filed on Apr. 6, 2012) is incorporated by reference in the present specification.

INDUSTRIAL APPLICABILITY

The features of the present invention can provide a communication control device and a communication control method by which a situation where the mobile station is disabled to receive a terminating call is prevented from continuing for a long time even when the IP-CAN Bearer is removed for some reason.

EXPLANATION OF THE REFERENCE NUMERALS

10 mobile communication system
100 UE
200 IP-CAN
300 IMS
310 P-CSCF
311 bearer state detection unit
313 registration state storage unit
315 terminating call control unit

The invention claimed is:

1. A communication control device which is capable of connecting to an access network according to Internet protocol and which controls a terminating call to a mobile station configured to execute registration to an IP multimedia subsystem according to the Internet protocol, the communication control device comprising:
    a bearer state detection unit configured to detect a state of a bearer which is a logical communication path between the mobile station and a gateway device included in the access network; and
    a terminating call control unit configured to transmit a rejection response to a source making the terminating call when the bearer state detection unit detects loss of the bearer which has been established, the rejection response rejecting a terminating call to the mobile station, wherein
    the terminating call control unit cancels the transmission of the rejection response when receiving a signal from the mobile station in a situation where the loss of the bearer is detected by the bearer state detection unit, the signal being related to an originating call to the IP multimedia subsystem and other than registration to the IP multimedia subsystem.

2. The communication control device according to claim 1, further comprising a registration state storage unit configured to store information indicating that the mobile station is registered with the IP multimedia subsystem, based on detection of establishment of the bearer by the bearer state detection unit, wherein
    the terminating call control unit cancels the transmission of the rejection response when: the mobile station is registered with the IP multimedia subsystem by the registration state storage unit; and the terminating call control unit receives the signal from the mobile station in the situation where the loss of the bearer is detected by the bearer state detection unit, the signal being related to the originating call to the IP multimedia subsystem and other than registration to the IP multimedia subsystem.

3. The communication control device according to claim 1, wherein the terminating call control unit cancels the transmission of the rejection response when receiving at least one of signals of SIP INVITE, MESSAGE, and OPTION from the mobile station.

4. The communication control device according to claim 1, wherein the terminating call control unit cancels the transmission of the rejection response and accepts the terminating call to the mobile station.

5. A communication control method which is capable of connecting to an access network according to Internet protocol and which is a method for controlling a terminating call to a mobile station configured to execute registration to an IP multimedia subsystem according to the Internet protocol, the communication control method comprising the steps of:
    detecting a state of a bearer which is a logical communication path between the mobile station and a gateway device included in the access network;
    transmitting a rejection response to a source making the terminating call when loss of the bearer which has been established is detected, the rejection response rejecting a terminating call to the mobile station; and
    canceling the transmission of the rejection response when receiving a signal from the mobile station in a situation where the loss of the bearer is detected, the signal being related to an originating call to the IP multimedia subsystem and other than registration to the IP multimedia subsystem.

\* \* \* \* \*